Feb. 4, 1930.  J. C. BARNABY  1,745,884
INTERNAL COMBUSTION ENGINE
Filed Dec. 30, 1927
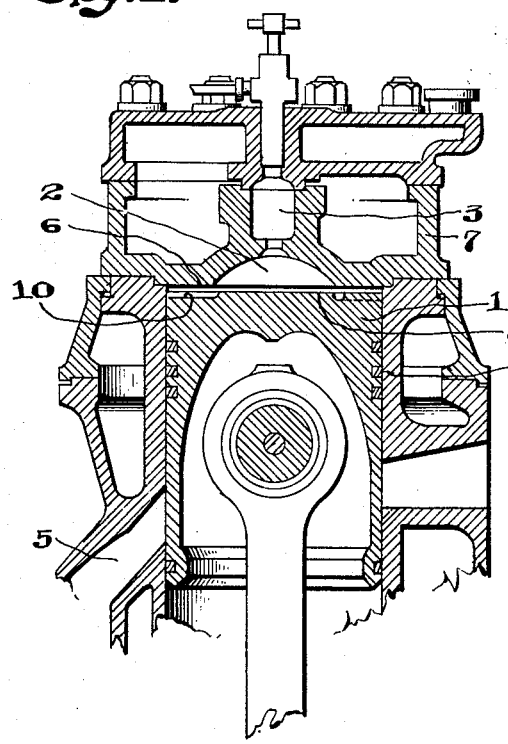
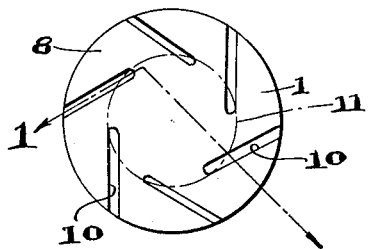
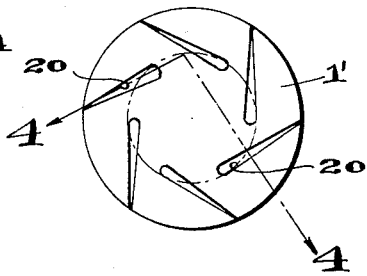
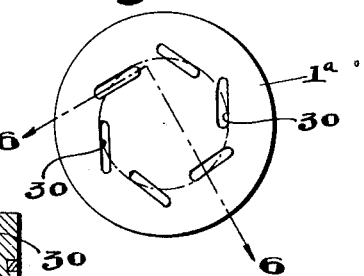
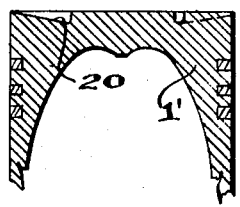
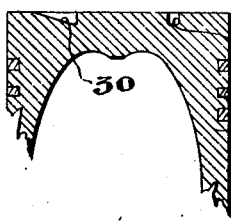
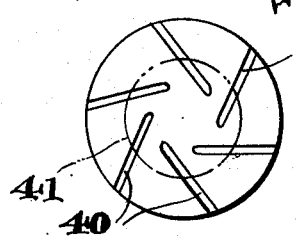
JAMES C. BARNABY.
INVENTOR
BY *[signature]*
ATTORNEY Patented Feb. 4, 1930

1,745,884

UNITED STATES PATENT OFFICE

JAMES C. BARNABY, OF WESTERLEIGH, STATEN ISLAND, NEW YORK, ASSIGNOR TO WORTHINGTON PUMP AND MACHINERY CORPORATION, OF NEW YORK, N. Y., A CORPORATION OF VIRGINIA

INTERNAL-COMBUSTION ENGINE

Application filed December 30, 1927. Serial No. 243,509.

This invention relates to internal combustion engines of the Diesel type and an object of the invention is to provide means preferably in the form of grooves or passage ways which will impart a rotary motion to air or gas as it is forced inwardly into the combustion chamber from between the flat part of the cylinder head and the adjacent surface of the piston, to produce turbulence in the compression space or chamber and result in a thorough mixing of the fuel.

With this object in view, the invention consists in various features of construction and combination of parts, which will be first described in connection with the accompanying drawings, showing an internal combustion engine of the preferred form embodying the invention, and the features forming the invention will be specifically pointed out in the claims.

In the drawings—

Figure 1 is a fragmentary vertical section through an internal combustion engine showing the improved piston therein.

Figure 2 is a top plan of the piston.

Figure 3 is a top plan of a modified form of the piston.

Figure 4 is a fragmentary vertical section through the piston taken on the line 4—4 of Figure 3.

Figure 5 is a top plan of a further modified form of the piston.

Figure 6 is a fragmentary vertical section taken on the line 6—6 of Figure 5.

Figure 7 is a plan view of another modified form of the piston.

Referring more particularly to the drawings, the improved piston is shown associated with an internal combustion engine of the Diesel type of any approved form. The engine embodies a combustion chamber 2 into which the atomized fuel oil is fed from the pre-combustion chamber 3 and while a particular type of cylinder head is illustrated in the drawings it is to be understood that the piston embodied in the present invention may be used in connection with any suitable type of internal combustion engine without departing from the spirit of this invention.

During the compression stroke of the piston 1 the air which is admitted to the cylinder 4 through the scavenging or air inlet port 5 is forced upwardly and compressed by the piston 1 and as the piston nears the upper limit of its movement the air between the flat surface 6 of the cylinder head 7 and the adjacent surface or top 8 of the piston 1 is forced or squeezed inwardly to the compression chamber 2 and for the purpose of providing turbulence in the combustion chamber, the upper surface 8 of the piston 1 is provided with a plurality of grooves or passage ways 10 which are spirally arranged or extend tangentially from the lower perimeter of the combustion chamber 2, such perimeter or edge being indicated by a dot and dash line 11 in Figure 2 of the drawings. By providing these spirally arranged or tangentially extending grooves or passage ways in the upper surface of the piston 1 the air will be forced into the combustion chamber 2 with a rotary motion resulting in a thorough mixing of the air with the fuel oil which is injected into the combustion chamber.

In Figures 3 and 4 of the drawings a modified form of the invention is shown and in this form the grooves or passage ways 20 which are formed in the upper surface of the piston 1' gradually decrease in width and depth towards the perimeter of the piston. In all other respects and in their operation and function the modified form shown in Figures 3 and 4 is the same as the form illustrated in Figures 1 and 2.

In Figures 5 and 6 of the drawings a further modified form of the invention is shown in which the grooves or passage ways 30 which are formed in the upper surface of the piston 1ª and are spirally arranged or extend tangentially to the outer lower edge of the combustion chamber, are of uniform width throughout their length but decrease in depth from their innermost ends to their outer ends, also the said grooves extend only a part of the piston to the perimeter of the piston in contradistinction to the slots 10 and 20 which extend to the edge or perimeter of their respective pistons.

Figure 7 shows a slight difference in the construction of the piston over the various forms shown in Figures 1—6 inclusive. In Figures 1—6 inclusive the grooves or passageways 10, 20 and 30 respectively extend tangentially outwardly from the outer edge of the combustion chamber. It is not necessary however, to extend these grooves inwardly only to the outer edge of the combustion chamber, but they may be extended inwardly to any desired point relative to the longitudinal center of the piston.

In Figure 7 the grooves 40 extend inwardly beyond the outer edge of the combustion chamber (such edge being indicated by the dotted circle 41) but they are spirally arranged and preferably extend tangentially to a circle concentric of the perimeter of the piston.

It will be understood that the invention is not to be limited to the specific construction or arrangement of parts shown but that these may be modified widely within the invention defined by the claims.

What is claimed is:

1. An internal combustion engine including a cylinder, a cylinder head and a piston, and having a combustion chamber therein of less diameter than the cylinder bore, said piston provided with a plurality of grooves in its upper surface substantially tangential to the perimeter of the combustion chamber, said piston and cylinder head co-operating towards the end of the compression stroke of the engine to force gas from the perimetric portion of the cylinder through said grooves into said combustion chamber.

2. An internal combustion engine including a cylinder, a cylinder head and a piston, and having a combustion chamber therein of less diameter than the cylinder bore, said piston provided with a plurality of grooves in its upper surface tangential to the perimeter of the combustion chamber, said piston and cylinder head co-operating towards the end of the compression stroke of the engine to force the gas from the perimetric portion of the cylinder through said grooves into said combustion chamber, said grooves gradually decreasing in depth towards the perimeter of the piston.

3. An internal combustion engine including a cylinder, a cylinder head and piston, and having a combustion chamber therein of less diameter than the cylinder bore, said piston provided with a plurality of passage ways in its upper surface arranged to co-operate with said cylinder head towards the end of the compression stroke of the engine to force gas inwardly into the combustion chamber in a rotating manner for providing turbulence in said combustion chamber, said passage ways extending tangentially to the perimeter of the combustion chamber and gradually increasing in cross sectional area from their outer to their inner ends.

4. In an internal combustion engine, a cylinder, a piston and a cylinder head having a combustion chamber therein of less diameter than the cylinder bore, said piston provided with a plurality of passage ways in its upper surface arranged for co-operation with the cylinder head towards the end of the compression stroke of the engine to direct gas inwardly into the combustion chamber in a rotating manner for providing turbulence in said combustion chamber.

5. In an internal combustion engine, a cylinder, a piston and a cylinder head having a combustion chamber therein of a less diameter than the cylinder bore, said piston provided with a plurality of passage ways in its upper surface arranged for co-operation with the cylinder head towards the end of the compression stroke of the engine to direct gas inwardly into the combustion chamber in a rotating manner for providing turbulence in said combustion chamber, said passage ways gradually increasing in cross sectional area from their outer to their inner ends.

In testimony whereof I affix my signature.

JAMES C. BARNABY.